Patented Nov. 15, 1949

2,487,885

UNITED STATES PATENT OFFICE 2,487,885

COPOLYMERS OF BETA-PROPIONOLACTONE

James E. Magoffin and Hugh J. Hagemeyer, Jr., Kingsport, Tenn., assignors to Eastman Kodak Company, Rochester, N. Y., a corporation of New Jersey No Drawing. Application September 12, 1947, Serial No. 773,736

14 Claims. (Cl. 260—63)

This invention relates to the preparation of new synthetic, resinous copolymers. More specifically this invention concerns a process for preparing resinous copolymers which comprises polymerizing a mixture of β-propionolactone and an unsaturated organic compound.

It is known that β-propionolactone can be homopolymerized easily by heating in the presence or absence of a catalyst. Kung in U. S. Patent 2,361,036, dated October 24, 1944, has shown that β-propionolactone can be homopolymerized to form a linear polyester by heating the lactone with a Friedel-Crafts type catalyst or other condensation catalysts, such as potassium carbonate, sodium acetate, etc. in the presence of a solvent.

We have now found that new, resinous copolymers of β-propionolactone can be prepared by heating a mixture comprising β-propionolactone and a polymerizable unsaturated organic compound.

It is, therefore, an object of this invention to provide new synthetic copolymers of β-propionolactone and an unsaturated organic compound. A further object of this invention is to provide a process for preparing new, resinous copolymers of β-propionolactone and a polymerizable unsaturated organic compound. Other objects will become apparent from a consideration of the following description.

According to our process, we prepare new, resinous copolymers by heating a mixture comprising β-propionolactone and a polymerizable unsaturated organic compound.

The β-propionolactone which we use in our invention can be represented by the formula:

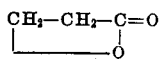

Kung in U. S. Patent 2,356,459, date August 22, 1944, shows a method of preparing β-propionolactone which comprises reacting ketene with formaldehyde in the presence of a Friedel-Crafts type catalyst. Another method is described in a copending application of Hugh J. Hagemeyer, Jr., Serial No. 660,287, filed April 5, 1946 now Patent No. 2,469,110. Surprisingly, it has been found that while other β-lactones, such as β-butyrolactone, do not form copolymers with the unsaturated compounds employed in our invention, β-propionolactone forms copolymers with ease and yields products suitable for forming films, extruding into tubes, etc. This property of copolymerization of β-propionolactones which is not shared by higher members of the β-lactone series, suggests some peculiar molecular rearrangement or orientation. However, the mechanism of the reaction has not been fully investigated.

The unsaturated, polymerizable organic compounds which we can conveniently employ in our invention contain the group

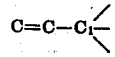

in which the carbon atom $C_1$ is doubly bound to another atom such as carbon, oxygen, or nitrogen, or triply bound to an atom such as carbon or nitrogen. Typical of the polymerizable unsaturated organic compounds which we may use are the acrylates, the α-methacrylates, fumarates, maleates, vinyl esters, alkyl alkenyl ketones, α-acyloxyalkenyl nitriles, alkenyl nitriles, and hydrocarbons containing conjugated olefinic unsaturation.

The acrylates or methacrylates which we can use can be represented by the formula:

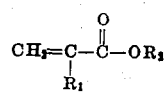

wherein $R_1$ represents a hydrogen atom or a methyl group, and $R_2$ represents an alkyl group such as methyl, ethyl, propyl, butyl, isobutyl, secondary and tertiary butyl (i. e., an alkyl group having the formula $C_nH_{2n+1}$ where $n$ is a positive integer from 1 to 4), an alkenyl group such as vinyl, allyl, methallyl, crotyl, (i. e., an alkenyl group having the formula $C_nH_{2n-1}$ where $n$ is a positive integer from 2 to 4), or an aralkyl group such as benzyl, β-phenylethyl, β-phenylbutyl (i. e., an aralkyl group of the benzene series having 7 to 10 carbon atoms). Typical of the acrylates and methacrylates are: methyl acrylate, methyl α-methacrylate, ethyl acrylate, n-propyl, α-methacrylate, n-butyl α-methacrylate, benzyl acrylate, allyl α-methacrylate, methallyl acrylate, etc. In addition, the acrylates or methacrylates derived from the etherified or esterified derivatives or poylhydric alcohols can be used. Examples of such esters are ethylene glycol dimethacrylate, diethylene glycol diacrylate, diethylene glycol acetate α-methacrylate, β-ethoxyethyl acrylate, β-butoxyethyl α-methacrylate, etc., i. e., the acrylates and methacrylates of polyvalent alcohols represented by the formula:

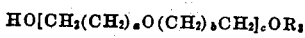

where $R_3$ represents an alkyl group having the formula $C_nH_{2n+1}$ where $n$ is a positive integer from 1 to 4, an acyl group such as acetyl, propionyl, butyryl, acryl, α-methacryl, benzoyl, toluoyl, etc. (i. e., an acyl radical of a monobasic carboxylic acid having 2 to 7 carbon atoms), and $a$, $b$, and $c$ represent a positive integer from 1 to 2.

The maleates or fumarates which we can advantageously use can be represented by the formula:

$$R_4OC-CH=CH-C-OR_5$$

wherein $R_4$ and $R_5$ represent the same or different groups as defined by $R_3$ above. Typical esters are dimethyl maleate, dimethyl fumarate, diisopropyl fumarate, diethyl fumarate, diethyl maleate, dipropyl maleate, di-n-butyl fumarate, di-n-butyl maleate, dimethallyl maleate, dibenzyl fumarate, etc. In addition, the simple or polyesters of polyvalent alcohols defined by the formula:

$$HO[CH_2(CH_2)_aO(CH_2)_bCH_2]_cOR_3$$

wherein $R_3$, $a$, $b$, and $c$ have the above definitions can be used. Typical of such esters are di-β-ethoxyethyl maleate, di-β-butoxyethyl fumarate, ethyl β-ethoxyethyl maleate, di-β-acetoxyethyl maleate, etc.

The vinyl esters which we can use may be represented by the formula:

$$R_6C-O-CH=CH_2$$
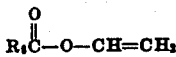

wherein $R_6$ represents an alkyl group such as methyl, ethyl, propyl, butyl, hexyl, octyl, nonyl, decyl, undecyl, tetradecyl, heptadecyl, etc., (i. e., an alkyl group of the formula $C_nH_{2n+1}$ where $n$ is a positive integer from 1 to 17), or an aryl group such as phenyl, chlorophenyl, o-, m-, and p-tolyl. Typical are vinyl acetate, vinyl propionate, vinyl butyrate, vinyl oleate, vinyl benzoate, vinyl chlorobenzoate, etc. In addition, the vinyl esters of dicarboxylic acids such as divinyl succinate, divinyl adipate, divinyl sebacate, divinyl phthalate, etc. can be used.

The alkyl alkenyl ketones which we can use may be represented by the formula:

$$R_7-C-R_8$$

wherein $R_7$ is an alkyl group, such as methyl, ethyl, propyl, isopropyl, butyl, isobutyl, secondary and tertiary butyl (i. e., an alkyl group of the formula $C_nH_{2n+1}$ where $n$ is a positive integer from 1 to 4) and $R_8$ is an alkenyl radical such as vinyl, isopropenyl, allyl, methallyl, crotyl (i. e., an alkenyl group of the formula $C_nH_{2n-1}$ where $n$ is a positive integer from 2 to 4). Typical of such ketones are methyl, vinyl ketone, methyl isopropenyl ketone, ethyl isopropenyl ketone, etc. Other ketones such as divinyl ketone, diallyl ketone, etc. can also be used.

The acyloxy alkenyl nitriles which we can advantageously use can be represented by the formula:

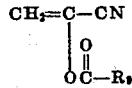
$$CH_2=C-CN$$
$$\quad | $$
$$\quad O$$
$$\quad OC-R_9$$

wherein $R_9$ represents an alkyl group, such as methyl, ethyl, propyl, isopropyl, butyl or isobutyl (i. e., an alkyl group having the formula $C_nH_{2n+1}$ where $n$ is a positive integer from 1 to 4). Typical are α-acetoxyacrylonitrile, α-propionoxyacrylonitrile, α-isobutyroxyacrylonitrile, etc.

The alkenyl nitriles which we can use can be represented by the formula:

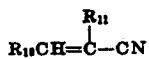
$$R_{10}CH=C-CN$$
$$\quad | $$
$$\quad R_{11}$$

wherein $R_{11}$ represents a hydrogen atom or an alkyl group, such as methyl, ethyl, (i. e., an alkyl group having the formula $C_nH_{2n+1}$ where $n$ is a positive integer from 1 to 2) and $R_{10}$ is a hydrogen atom or methyl group. Typical are acrylonitrile, α-methacrylonitrile, 1-cyano-1-propene, and 1-cyano-1-butene.

The hydrocarbons which we may use contain the group:

$$-CH=C<$$

or a multiple thereof. Typical are the aliphatic diolefins such as butadiene-1,3, isoprene, piperylene, 2,3-dimethyl-1,3-butadiene, 1,3-hexadiene, etc., the cycloaliphatic diolefins, such as cyclopentadiene, 1,3-cyclohexadiene, 2,2,1-bicycloheptadiene-1,3, etc., and aromatic olefins such as styrene, isopropenyl benzene, o-, m-, and p-methyl styrene, etc. Also vinyl acetylene, divinyl acetylene, etc., can be used.

In accordance with our invention we copolymerize β-propionolactone with one or more of the polymerizable unsaturated organic compounds listed above. The copolymerization is accelerated by heat, and by the polymerization catalysts which are known to accelerate the polymerization of vinyl-type compounds. Exemplary of such catalysts are the organic peroxides (e. g., benzoyl peroxide, acetyl peroxide, benzoyl acetyl peroxide, lauroyl peroxide, etc.), hydrogen peroxide, perborates (e. g., alkali metal perborates) and persulfates (e. g., alkali metal persulfates).

The temperature at which the copolymerization is effected can vary from ordinary room temperatures (20–25° C.) to approximately 50 to 60° C. The copolymerization can also be carried out by the bead or emulsion method in which water or some other medium in which the monomers are insoluble is employed as a dispersing medium, with or without emulsifying agents. The emulsion method of copolymerization is particularly suitable where a large ratio of β-propionolactone to unsaturated organic compound is desired. The copolymerization can also be effected in the presence of a diluent, such as benzene, toluene, etc., which is advantageously a solvent for the copolymer.

Generally, any weight ratio of β-propionolactone to unsaturated compound can be employed. Advantageously, we can use a ratio by weight of from 1:7 to 2:1 of β-propionolactone to the unsaturated compounds (i. e., 1:2 parts by weight of β-propionolactone and 1:7 parts by weight of unsaturated compound can be used). If a relatively large ratio of β-propionolactone to unsaturated compounds has been used, the resulting product may be only slightly viscous or may consist of the copolymer dissolved in the excess of β-lactone. To obtain the solid copolymer it is merely necessary to add a solvent to the reaction mixture which dissolves the excess β-propionolactone but not the copolymer, thus precipitating the copolymer. Such solvents as methyl or ethyl alcohol are suitable for this purpose, although acetic acid, diethyl ether, etc., can also be used.

The following examples will serve to characterize our invention further.

Example 1

β-propionolactone and styrene, in the amounts given in the tabulation below, were copolymerized at 50° C. using 0.20–3% by weight, based on the total weight of the reaction mixture, of a 4% solution of acetyl peroxide in dimethyl phthalate as catalyst. The polymerization took place smoothly and was complete in 24 hours. The results obtained were as follows:

| β-Propiono Lactone | Styrene | Weight Ratio | Mol. Ratio | Remarks |
|---|---|---|---|---|
| Grams | Grams | | | |
| 4 | 8 | 1/2 | 8/11 | hard, clear, colorless. |
| 4 | 12 | 1/3 | 1/2 | Do. |
| 3 | 12 | 1/4 | 7/19 | Do. |
| 2 | 10 | 1/5 | 4/15 | hard, clear, surface crazing. |
| 2 | 12 | 1/6 | 1/4 | hard, clear, colorless. |
| 2 | 14 | 1/7 | 1/5 | Do. |

Example 2

β-propionolactone and methyl acrylate, in the amounts given in the tabulation below were copolymerized by heating in sealed tubes in the presence of 0.05%, by weight, based on the total weight of the reaction mixture of a 4% solution of acetyl peroxide in dimethyl phthalate as catalyst. The temperature was maintained at 45° C. by means of a constant temperature water bath so that efficient heat transfer may be obtained. Usually the heating required an induction period of several hours, after which the polymerization took place rapidly and to completion. The copolymers thus obtained had rubber-like properties, and showed good elasticity and low strength. Surface hardening was effected by heating at 60–100° C. in the presence of air. The results obtained were as follows:

| β-Propiono Lactone | Methyl Acrylate | Weight Ratio | Mol. Ratio | Remarks |
|---|---|---|---|---|
| Grams | Grams | | | |
| 7.2 | 8.6 | | 1/1 | Soft, clear, colorless, low strength. |
| 10 | 10 | 1/1 | | |
| 3.6 | 8.6 | | 1/2 | hard rubber, clear, colorless. |
| 5 | 10 | 1/2 | | |
| 7.2 | 4.3 | | 2/1 | soft, clear, colorless, low strength. |
| 10 | 5 | 2/1 | | |

Example 3

β-propionolactone and diisopropyl fumarate, in the weight ratios given below, were copolymerized by heating at 45° C. with 0.05% by weight, based on the total weight of the reaction mixture, of a 4% acetyl peroxide solution in dimethyl phthalate as catalyst. The results obtained follow:

Weight ratio of β-propionolactone
to diisopropyl fumarate:                Remarks
1/2 _____ Hard, opaque resin
1/1 _____ Do.
2/1 _____ Do.

Example 4

In the manner identical to that described in Example 1, β-propionolactone and methyl methacrylate were copolymerized. The results obtained were as follows:

| β-Propiono Lactone | Methyl Methacrylate | Weight Ratio | Mol. Ratio | Remarks |
|---|---|---|---|---|
| Grams | Grams | | | |
| 7.2 | 10 | | 1/1 | medium, hard, clear, colorless. |
| 10 | 10 | 1/1 | | |
| 3.6 | 10 | | 1/2 | hard, clear, colorless. |
| 5 | 10 | 1/2 | | |
| 7.2 | 5 | | 2/1 | soft, clear, colorless, surface hardening. |
| 10 | 5 | 2/1 | | |

Example 5

β-propionolactone (10 gms.) and methyl vinyl ketone (10 gms.) were copolymerized by heating at 40° C. for 48 hours in the presence of 0.06% by weight, based on the total weight of the reaction mixture of benzoyl peroxide. A resin, soft pale in color, was obtained.

Example 6

β-propionolactone and α-acetoxy acrylonitrile, in the weight ratios given below, were copolymerized by heating at 60° C. in the presence of 0.05% by weight, based on the total weight of the reaction mixture, of a 4% acetyl peroxide solution in dimethyl phthalate. The results obtained are as follows:

Weight ratio of β-propionolactone
  to α-acetoxy acrylonitrile:           Remarks
   1/1 _____ hard, clear, dark brown resin
   1/2 _____ Do.
   1/3 _____ Do.

Example 7

This example illustrates the emulsion method of preparing the resins of our invention. Thus, 200 grams of methyl methacrylate, 72 grams of β-propionolactone, 0.5 gram of gum arabic, and 1 gram of 4% acetyl peroxide in dimethyl phthalate were dispersed in 750 ml. of distilled water, and then agitated at 45° C. for 24 hours. Clear, colorless small beads were obtained in 89% yield (243 grams).

Other unsaturated polymerizable organic compounds can replace those illustrated in the above examples. Other valuable resins can be prepared by heating β-propionolactone and ethylene glycol diacrylate, β-propionolactone and cyclopentadiene, β-propionolactone and methyl isopropenyl ketone, etc.

The synthetic resins and elastomers obtained according to the process of our invention are suitable for molding compositions, production of sheets, films, foils, etc.

We claim:

1. A resinous copolymer obtained by polymerizing in the presence of a peroxide polymerization catalyst a mixture comprising from 1 to 2 parts by weight of β-propionolactone and from 1 to 7 parts by weight of styrene.

2. A resinous copolymer obtained by polymerizing in the presence of a peroxide polymerization catalyst a mixture comprising from 1 to 2 parts by weight of β-propionolactone and from 1 to 7 parts by weight of methyl α-methacrylate.

3. A resinous copolymer obtained by polymerizing in the presence of a peroxide polymerization catalyst a mixture comprising from 1 to 2 parts by weight of β-propionolactone and from 1 to 7 parts by weight of an alkyl alkenyl ketone represented by the formula:

wherein R is an alkyl radical having the formula $C_nH_{2n+1}$ wherein $n$ is a positive integer from 1 to 4 and $R_1$ is an alkenyl radical having the formula $C_nH_{2n-1}$ wherein $n$ is a positive integer from 2 to 4.

4. A resinous copolymer obtained by polymerizing in the presence of a peroxide polymerization catalyst a mixture comprising from 1 to 2 parts by weight of β-propionolactone and from 1 to 7 parts by weight of methyl vinyl ketone.

5. A process for preparing a resinous copolymer which comprises polymerizing in the presence of a peroxide polymerization catalyst a mixture consisting of 1 to 2 parts by weight of β-propionolactone and 1 to 7 parts by weight of an alkyl alkenyl ketone having the formula:

wherein R represents an alkyl group having the formula $C_nH_{2n+1}$ wherein $n$ is a positive integer from 1 to 4 and $R_1$ represents an alkenyl group having the formula $C_nH_{2n-1}$ wherein $n$ is a positive integer from 2 to 4.

6. A process for preparing a resinous copolymer which comprises polymerizing in the presence of a peroxide polymerization catalyst a mixture consisting of from 1 to 2 parts by weight of β-propionolactone and 1 to 2 parts by weight of methyl α-methacrylate.

7. A process for preparing a resinous copolymer which comprises polymerizing in the presence of a peroxide polymerization catalyst a mixture consisting of 1 to 2 parts by weight of β-propionolactone and 1 to 7 parts by weight of methyl vinyl ketone.

8. A process for preparing a resinous copolymer which comprises polymerizing in the presence of a peroxide polymerization catalyst a mixture consisting of 1 to 2 parts by weight of β-propionolactone and 1 to 7 parts by weight of styrene.

9. A resinous copolymer obtained by polymerizing in the presence of a peroxide polymerization catalyst a mixture comprising from 1 to 2 parts by weight of β-propionolactone and from 1 to 7 parts by weight of a compound containing a polymerizable $$-CH=C<$$

group, prior to the polymerization.

10. A resinous copolymer obtained by polymerizing in the presence of a peroxide polymerization catalyst a mixture comprising from 1 to 2 parts by weight of β-propionolactone and from 1 to 7 parts by weight of a compound containing a polymerizable $$CH_2=C<$$

group, prior to the polymerization.

11. A resinous copolymer obtained by polymerizing in the presence of a peroxide polymerization catalyst a mixture comprising from 1 to 2 parts by weight of β-propionolactone and from 1 to 7 parts by weight of an ester selected from those represented by the following general formula:

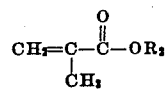

wherein $R_2$ represents an alkyl group having the formula $C_nH_{2n+1}$ wherein $n$ is a positive integer from 1 to 4.

12. A process for preparing a resinous copolymer comprising polymerizing from 1 to 2 parts by weight of β-propionolactone and from 1 to 7 parts by weight of a compound containing a polymerizable $$-CH=C<$$

group in the presence of a peroxide polymerization catalyst.

13. A process for preparing a resinous copolymer comprising polymerizing from 1 to 2 parts by weight of β-propionolactone and from 1 to 7 parts by weight of a compound containing a polymerizable $$CH_2=C<$$

group in the presence of a peroxide polymerization catalyst.

14. A process for preparing a resinous copolymer comprising polymerizing from 1 to 2 parts by weight of β-propionolactone and from 1 to 7 parts by weight of an ester selected from those represented by the following general formula:

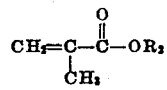

wherein $R_2$ represents an alkyl group having the formula $C_nH_{2n+1}$ wherein $n$ is a positive integer from 1 to 4 in the presence of a peroxide polymerization catalyst.

JAMES E. MAGOFFIN.
HUGH J. HAGEMEYER, JR.

No references cited.